United States Patent [19]

Brown

[11] Patent Number: 4,759,667
[45] Date of Patent: Jul. 26, 1988

[54] TWIST DRILL FOR DRILLING PRINTED CIRCUIT BOARD LAMINATES AND HAVING AN DRILL POINT GEOMETRY

[75] Inventor: Charles R. Brown, Quinton, Va.

[73] Assignee: American Telephone and Telegraph Company, AT&T Technologies, Inc., Berkeley Heights, N.J.

[21] Appl. No.: 796,286

[22] Filed: Nov. 8, 1985

[51] Int. Cl.[4] ............................................. B23B 51/02
[52] U.S. Cl. ..................................... 408/230; 408/227
[58] Field of Search ................ 408/227, 228, 230, 715

[56] References Cited

U.S. PATENT DOCUMENTS

| | | | |
|---|---|---|---|
| 2,817,983 | 12/1957 | Mossberg | 408/59 |
| 2,897,695 | 8/1959 | Winslow | 408/223 |
| 2,903,921 | 9/1959 | Andreasson | 408/230 |
| 2,936,658 | 5/1960 | Riley | 408/230 |
| 3,387,511 | 6/1968 | Ackart | 408/230 |
| 3,400,617 | 9/1968 | Sanborn | 408/223 |
| 3,778,180 | 12/1973 | Ostrom | 408/226 |
| 3,933,075 | 1/1976 | Peterson | 408/230 |
| 4,065,224 | 12/1977 | Siddall | 408/230 |
| 4,080,093 | 3/1978 | Maier | 408/230 |
| 4,116,580 | 9/1978 | Hall | 408/230 |
| 4,222,690 | 9/1980 | Hosoi | 408/230 |
| 4,231,692 | 11/1980 | Brabetz | 408/230 |
| 4,286,677 | 9/1981 | Guex | 408/230 |
| 4,561,813 | 12/1985 | Schneider | 408/230 |

FOREIGN PATENT DOCUMENTS

| | | | |
|---|---|---|---|
| 602663 | 9/1934 | Fed. Rep. of Germany . | |
| 2228122 | 2/1975 | Fed. Rep. of Germany . | |
| 568647 | 3/1924 | France | 408/230 |
| 1352808 | 1/1964 | France . | |
| 563118 | 6/1979 | Japan . | |
| 1419624 | 12/1975 | United Kingdom | 408/230 |

OTHER PUBLICATIONS

"How to Drill Precision Holes in Reinforced Plastics in a Hurry" *Plastic Engineering*, Feb. 1980, pp. 22–24, Bruce A. Mackey, Jr., et al.
Article entitled "Smaller PCE Holes Require New Drill Designs" Electronic Production—Apr. 1984, pp. 31–33, Howard W. Markstein.
Letters from the Law Offices of Dick and Harris, Chicago, Illinois, dated Dec. 5, 1985, and Jan. 29, 1986, referencing inventorship of a drill point geometry.
Megatool "Point Geometry Specification Sheet".
"Metal Cutting Took Handbook", Sixth Edition (1969).

*Primary Examiner*—Gil Weidenfeld
*Assistant Examiner*—Daniel W. Howell
*Attorney, Agent, or Firm*—Alfred G. Steinmetz

[57] ABSTRACT

A four surface point type drill has its primary clearance faces configured so that their circumferential width decreases as the longitudinal axis of the drill is approached. The trailing edge and cutting edge of the primary clearance face surfaces substantially intersect each other at a point where they both intersect the opposite ends of the chisel edge of the drill point. The chisel edge itself is totally defined by a line formed by the intersection of the two secondary clearance face surfaces of the drill point. This new improved drill point geometry permits the use of reduced primary and secondary clearance face relief angles at the drill point which improves the structural integrity of the cutting edge of the drill and hence reduces chipping at the cutting edge.

16 Claims, 3 Drawing Sheets

TWIST DRILL FOR DRILLING PRINTED CIRCUIT BOARD LAMINATES AND HAVING AN DRILL POINT GEOMETRY

FIELD OF THE INVENTION

This invention relates to twist drills and more particularly to twist drills used to drill holes in printed circuit board laminates. It is specifically concerned with a twist drill having an improved drill point geometry.

BACKGROUND OF THE INVENTION

The drilling of holes in both single sided, double sided, and multilayer printed circuit board laminates is a particularly critical machining operation. Good quality holes are essential to producing high quality circuit boards. A good quality hole is one that is produced having minimal defects. Such defects typically include resin smear, nail heading, rough hole walls, inaccuracy of the hole size and of its position on the board. While some of these problems may be alleviated by proper choice and proper curing of the laminated material and use of a proper backup material, a complete solution requires a drill of proper design and the application of proper drilling techniques. These drill design and drilling techniques are controlled by a balance of drilling feeds and speeds and the geometry and condition of the drill edges and clearance face surfaces. A drill having the wrong drill point geometry and/or with worn cutting edges generates excessive heat during the drilling operation. This is particularly critical in drilling circuit board laminates since the epoxy material used in the laminates is a poor heat conductor. The heat of drilling may cause the epoxy to melt or flow and cause resin smear within the drilled hole. If the cutting edges of the drill are chipped excessively, burring and nail heading conditions may be created since the drill is no longer cutting cleanly. Nail heading conditions occur most frequently in the instance of point chipping of the drill in which excessive chipping occurs at the outside corners of the interface where the primary cutting edge meets the margin cutting edge. It has been found that this chipping of the cutting edges is due to shear forces encountered in the cutting wedge of the drill. It tends to occur very early in the life of a drill thereby requiring frequent drill changes which are expensive in terms of both drill cost and production down time.

BRIEF SUMMARY OF THE INVENTION

Improvement in the quality of drilled holes in circuit board laminates is attained, in accord with the principles of the invention, with a drill having a novel and improved drill point geometry that permits the drill to run cooler during drilling operations and that significantly reduces chipping of the cutting edges of the drill. In a particular embodiment of the invention, a new drill point geometry utilizes a novel primary and secondary clearance face surface contour. This novel primary and secondary clearance face surface contour is combined with new primary and secondary clearance face relief angles, chisel angles and fluting geometry to produce a drill having a signicantly improved performance in drilling circuit board laminates.

In a particular four surface point type drill embodying the principles of the invention, the primary clearance face surface of the drill point is configured so that its circumferential width decreases as the longitudinal axis of the drill is approached. The trailing edge and cutting edge of the primary clearance face surface substantially intersect each other at a point where they both intersect the chisel edge of the drill point. The chisel edge itself is totally defined by a line formed by the intersection of the two secondary clearance face surfaces of the drill point. This new improved geometry permits the use of reduced primary and secondary clearance face relief angles at the drill point which improve the structural integrity of the cutting edge of the drill and reduces chipping of the cutting edge. The dihedral angle formed by the two secondary clearance face surfaces totally defines a chisel angle. This chisel angle is greater than that of a conventional drill's chisel angle and hence permits a more efficient removal of material in the center of the hole being drilled.

In yet another embodiment of the invention, the primary cutting edge and the associated fluting contour is modified so that the primary cutting edge has a concave curvature and hence provides a cutting edge with a positive rake angle in the leading edge of the margin. This advantageously provides shear type cutting action along the hole sidewall rather than the heat generative rubbing action caused by the negative rake angle at the margin in the conventional drills.

BRIEF DESCRIPTION OF THE DRAWING

The invention may be readily understood by reference to the following specification and the drawing in which.

DETAILED DESCRIPTION

Figure 1:
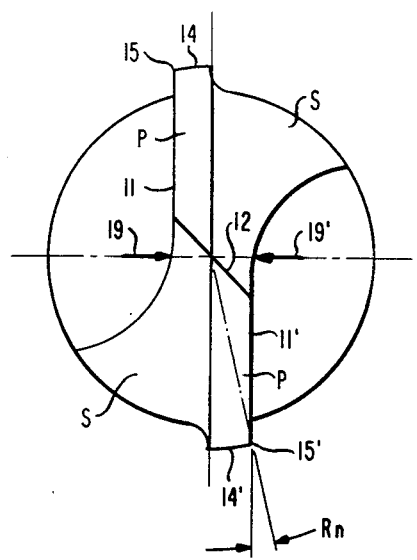
FIG. 1 shows an end view of the drill point geometry of a conventional twist drill presently used for drilling circuit board laminates.
Figure 3:
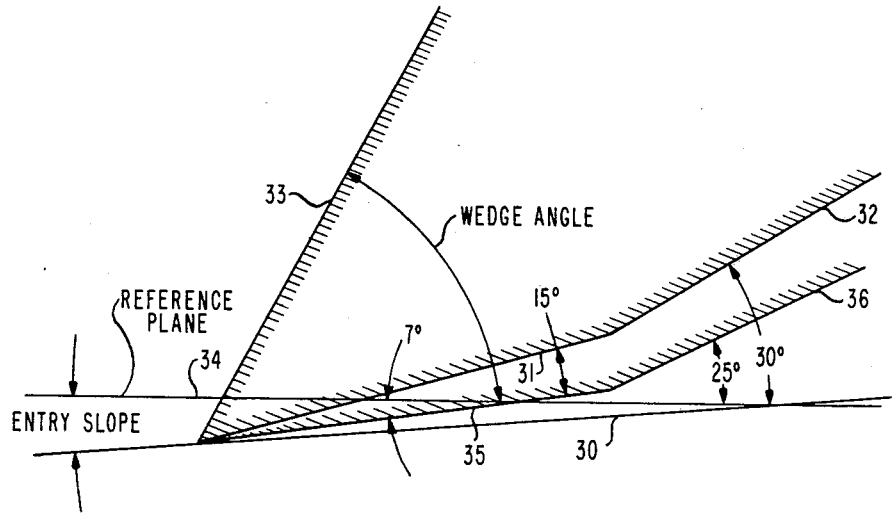
FIG. 3 is a line diagram comparing the primary and secondary clearance face relief angles of the twist drills shown in FIGS. 1 and 2.

An end view of the drill point geometry of a conventional four facet type twist drill for drilling holes in printed circuit board laminates is shown in FIG. 1. The two surfaces labeled P are the primary clearance face surfaces and the two surfaces labeled S are the secondary clearance face surfaces. The primary cutting edges 11 and 11' are responsible for the majority of material removal by cutting or shearing action from the panel being drilled. A small portion of material removal in the center of the hole is by the chisel edge 12, which crosses the web (between arrows 19-19' in FIG. 1) of the drill, to join the two drill flutes. This center material is removed by the rubbing or thrust action of the chisel edge 12, while the primary cutting edges 11 and 11' engage and cut the balance of the material from near the center to the sidewall of the hole. The primary clearance face surface P defining the cutting edges 11 and 11' has a primary clearance face relief angle, of approximately 15 degrees, as illustrated by line 31 in FIG. 3 in a graph depicting the drill point clearance face relief angles and the angle of descent or entry slope. A secondary clearance face relief angle of 30 degrees is shown by line 32 in FIG. 3, and provides additional relief behind the primary clearance face surface P. Line 33, in FIG. 3, depicts the flute or spiral angle at the leading edge of the drill's margin. Line 30 represents the angle of descent or entry slope of the drill which is determined by the feed rate, rotary speed of the drill, and radial distance from the drill's longitudinal axis. As used herein the entry slope 30 is defined as the angle between a plane perpendicular to the longitudinal axis of the drill and a line generated by the movement of a point in the primary cutting edge of the drill at a radial distance of interest (here a distance of 100% radius is depicted) as the drill is rotated about its longitudinal axis at a speed(s) and translated along its longitudinal axis into the plane of the material being cut (designated by line 39) at a feed rate (F).

As shown in FIG. 1, the four facets or surfaces of the conventional drill point all meet at the longitudinal axis 17 of the drill on the chisel edge 12. The flute or margin lip cutting edges, spiralling into the plane of FIG. 1 from corner points 15 and 15', meet the periphery or sidewall of the hole at a negative rake angle Rn, shown by a radial line 1 and a chordal line 2. This rake angle is an extension of the primary cutting edge 11, which in the conventional drill is normally −11 degrees, as shown by angle Rn in FIG. 1 and hence does not produce any positive shear cutting action on the side walls of the hole.

Drills with the conventional drill point geometry as shown in FIG. 1 have been unable to successfully overcome the two important defects of resin smear and nail heading which is the result of excessive heat generation while drilling and of chipping of the cutting edge, respectively. In practice, the drills have been found to chip on the primary cutting edges 11 and 11' and at the margins 14 and 14', and particularly at the corner points 15 and 15'. This particular chipping condition has been identified as an important factor in causing nail heading conditions in drilling multilayer circuit panels.

Figure 2:
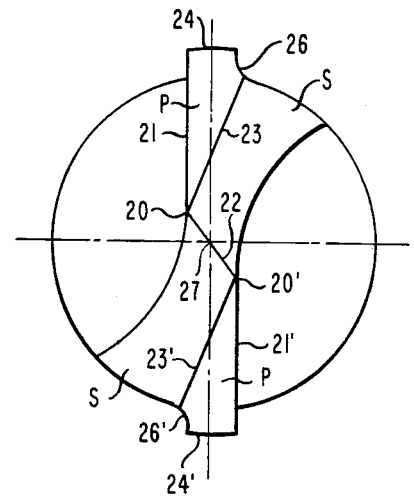
FIG. 2 shows an end view of the drill point geometry of a twist drill embodying the principles of the invention.

An end view of a drill with a new drill point geometry, embodying the principles of the invention, and which substantially reduces the resin smear and nail heading problems is shown in FIG. 2. As shown the two primary clearance face surfaces P have a substantially triangular shape each defined by primary cutting edges 21 and 21', trailing edges 23 and 23', margins 24 and 24' and the margin relief radii 26 and 26'. A line, representing the trailing edges 23 and 23' at the intersection of the primary and secondary clearance face surfaces P and S, intersects the end points 20 and 20' coincident with the opposite ends of the chisel edge 22 respectively. The chisel edge 22 intersects the longitudinal axis 27 of the drill. The primary and secondary clearance face surfaces are preferably flat but need not be so to practice the invention and their primary and secondary clearance face relief angles have been changed to substantially 7 degrees and 25 degrees, respectively, as shown by line angles 35 and 36 in FIG. 3. These angles may vary from 6 to 8 degrees for the primary clearance relief angle and from 23 to 27 degrees for the secondary clearance face relief angles. These values are illustrative and not intended to limit the scope of the invention. This altered drill point geometry and the new associated relief angles have been found to improve the strength of the cutting wedge defined by the solid drill body between the flute surface at the margin and the primary clearance face surface between lines 33–35, and the transition of wear from the primary clearance face surface to the secondary clearance face surface near the apex (center) or longitudinal axis 27 of the drill.

As is apparent from FIG. 2, the chisel edge 22 of the drill is defined entirely by the intersection of the two secondary clearance face surfaces S. This results in the chisel edge 22 having its included angle defined solely by the dihedral angle of the two secondary clearance face surfaces thereby producing an improved chisel angle at the drill point which permits more efficient removal of material in the center of a drilled hole during a drilling operation.

Figure 4:
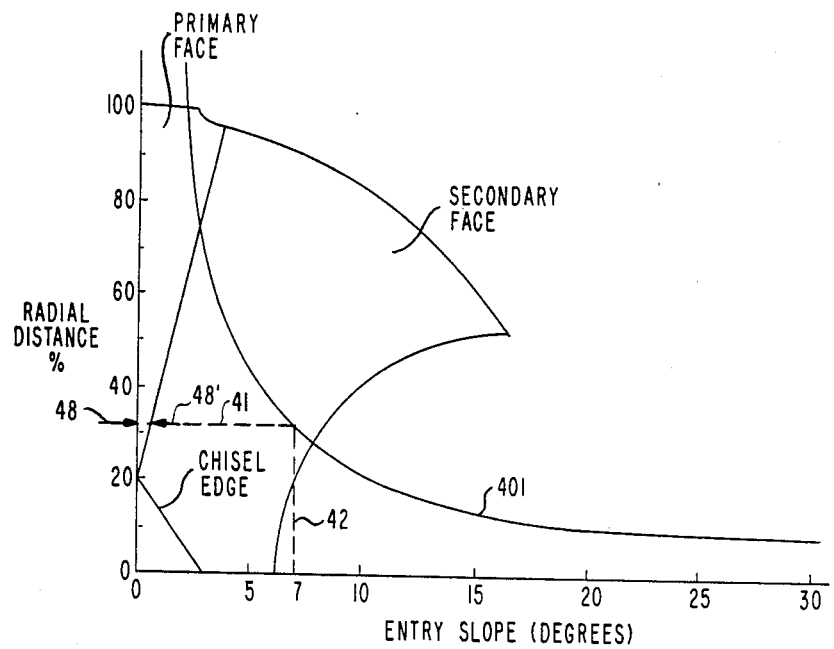
FIG. 4 is a graph showing how the entry slope of the cutting edge of a twist drill, embodying the principles of the invention, varies with a radial distance of the cutting edge from the center longitudinal axis of the drill.

The angle of descent or the entry slope at varying radial distances for a drill, embodying the principles of the invention, with a 0.050" diameter, and a feed of 0.006"/rev. is shown by the curve 401 in the graph of FIG. 4. It is readily apparent that the decreased primary clearance face relief angle of the drill shown in FIG. 2 and shown by line 35 in FIG. 3, as permitted by the novel point surface configuration of the drill provides a stronger backup to the cutting edge of the drill and inhibits chipping of the cutting edge. However, the reduced primary clearance face relief angle of the drill of FIG. 2 approaches the value of the angle of descent or the entry slope for a portion of the cutting edge near the longitudinal axis of the drill. As shown by the curve 401 in FIG. 4 the entry slope angle of the drill increases as one nears the center or longitudinal axis of the drill. At approximately 32% of the radial distance from the center of the drill (this value decreases with a decrease in drill bit advance per revolution) the primary clearance face relief angle equals the entry slope angle as is shown by the dotted lines 41 and 42 matching a coordinate point of the cure 401 to the two graph axes. However, at this radial distance, the primary clearance face is very narrow in the circumferential direction between arrows 48–48' as shown by the drill point profile shown in FIG. 4, and the secondary clearance face relief angle performs the clearance functions formerly performed by the primary clearance face relief angle in the conventional drill.

Figure 5:
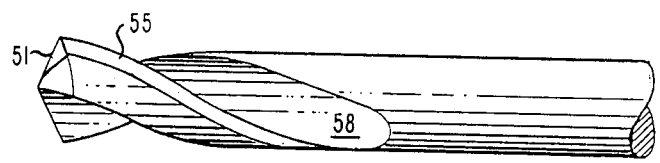
FIGS. 5 and 6 are side views of non-headed and headed drills respectively, each having a drill point geometry embodying the principles of the invention.
Figure 6:
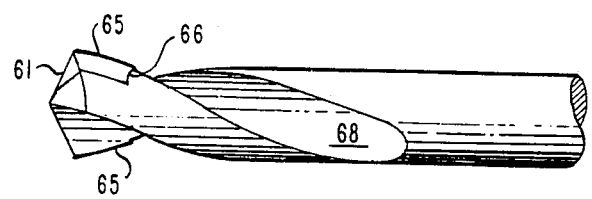

A side view of a non-headed and headed type drill embodying the principles of the invention is shown in FIGS. 5 and 6, respectively. Each drill has a point geometry embodying the primary and secondary clearance face surface contours such as are shown in FIG. 2. The primary clearance face surfaces P as shwon in FIGS. 5 and 6 respectively have substantially triangular surface contours. The margin cutting edge 65 shown in FIG. 6 extends from primary cutting edge 61 for only a short distance along the flute 68 from the drill point and terminates at point 66. This limits the length of drill in contact with the sidewalls during a drilling operation and permits it to run cooler. In the conventional non-headed drill of FIG. 5 the margin cutting edge 55 extends along the full length of the drill's flute 58, and hence, is in contact with the entire sidewall of the hole being drilled. This tends to make the non-headed drill of FIG. 5 generate more heat during drilling than the headed drill of FIG. 6.

Figure 8:
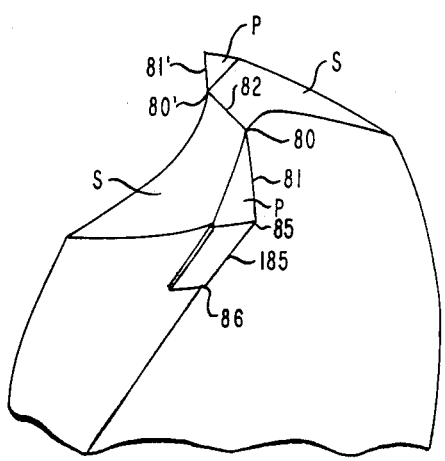
FIG. 8 shows an oblique perspective view of the drill point of a drill having a point geometry such as shown in FIG. 2.

An oblique perspective view of the drill point at the drill of FIG. 2 and FIG. 6 is shown in FIG. 8. The drill point comprises two primary clearance face surfaces P, and two secondary clearance face surfaces S. Two primary cutting edges 81 and 81' extend from opposite end points 80 and 80' of the chisel edge 82. The margin cutting edge 185 extends from corner point 85 and terminates at point 86. This short margin cutting edge 185 is the only portion of the margin in contact with the hole sidewall. The balance of the margin has a slightly lesser diameter and does not contact the sidewalls of the hole. This permits the drill to run cooler than a drill where the margin cutting edge extends along the entire flute of the drill. As shown, the secondary clearance face surface S must provide most of the clearance relief action as the primary cutting edges 81 and 81' approach the chisel edge end point 80 and 80' due to the narrowing of the circumferential width of the primary clearance face surfaces S.

Figure 7:
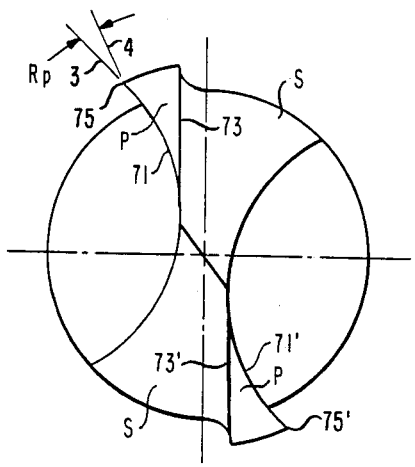
FIG. 7 shows an end view of another drill point geometry embodying the principles of the invention with a positive rake angle in the margin cutting edge.

The drill point geometry disclosed in FIG. 7 has its flute surfaces contoured so as to further provide a positive rake angle at the margin or flute cutting edges spiraling into the plane of FIG. 7 from corner points 75 and 75'. From drill point geometry is configured into the primary clearance face surfaces P and the secondary clearance face surface S. The primary clearance face surfaces P have the concave curvatured primary cutting edges 71 and 71' with the curve of the cutting edge having an asymptotic approach to the trailing or intersection edges 73 and 73' of the primary and secondary clearance face surfaces as they approach the chisel edge. The primary cutting edges 71 and 71' are defined by a modified flute cross sectional shape and as shown a tangent line 3 to the cutting edge at the corner point 75 leads to a radial line 4 passing trough the intersection of the primary cutting edge 71 with the corner point 75, thereby producing a positive rake angle Rp at the flute cutting edge.

The new flute groove cross sectional contour as shown in an end view of the drill point in FIG. 7 provides a positive curvature to the cutting edges 71 and 71' and hence the margin rake angle at the margin cutting edge is positive. This positive rake angle Rp at the margin causes the drill to cut at the sidewalls with a shear cutting action in contrast to the rubbing action of a conventional drill such as shown in FIG. 1. The new flute contour combined with the curved cutting edges 71 and 71' also more readily forces this sheared material out of the flutes away from the hole sidewall and out of the hole as opposed to the conventional flute contour having a margin with a negative rake angle where material is forced into the hole sidewalls thereby causing heat generation and epoxy smear.

Figure 9:
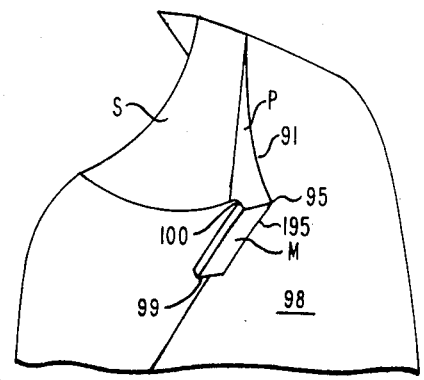
FIG. 9 shows an oblique perspective view of the drill point of a drill having a point geometry such as shown in FIG. 7.

The cutting edge of FIG. 7 and the associated flute contour may be also seen from the oblique perspective view of the drill point as shown in FIG. 9. The cutting edge 91 has a concave curvilinear contour defined by the curvature or contour of the flute 98. The trailing edge 99 of the margin clearance face includes a smooth radius 100 to reduce stress concentration. The point or corner cutting edge 95 and the margin cutting edge 195 has a positive rake angle and hence permits the drill to run cooler than conventional drills during drilling operations.

What is claimed is:

1. A drill having a four surface drill point geometry comprising:

a chisel edge having first and second ends and extending from a first flute on one side of a web of the drill to a second flute on an opposite side of the web and passing through a longitudinal axis of the drill, first and second primary clearance face surfaces positioned on opposite sides of the chisel edge, each primary clearance face surface having a surface contour substantially defined by a cutting edge, a trailing edge, a margin radius and a margin edge, the cutting edge and trailing edge of the first and second primary clearance face surfaces meeting with each other at a point substantially coincident with the first and second ends of the chisel edge, respectively, first and second secondary clearance face surfaces, contiguous to the trailing edge of the first and second primary clearance face surfaces, the first and second primary clearance face surfaces being sufficiently narrow in a circumferential direction at a radial distance close to the first and second ends of the chisel edge where an entry angle exceeds a primary clearance angle of the first and second primary clearance face surfaces to permit clearance provided by the first and second secondary clearance face surfaces to be adequate to facilitate proper drill functioning.

2. A drill as defined in claim 1 wherein the cutting edge has a concave curvature so that a margin of the drill has a positive rake angle with respect to sidewall of the hole being drilled with a line tanget to the cutting edge at the margin leading a radial line of the drill passing through an intersection of the cutting edge and the margin.

3. A drill as defined in claim 1 wherein the cutting edge is straight.

4. A drill as defined in claims 2 or 3, and whereby the chisel edge is completely defined by an intersection of the first and second secondary clearance face surfaces.

5. A drill as defined in claim 4 wherein a primary clearance face relief angle of the drill is within a range of 6 degrees to 8 degrees and a secondary clearance face relief angle is within a range of 23 degrees to 27 degrees.

6. A drill having a four surface drill point geometry comprising:

a chisel edge at a point end of the drill and extending from one side of a web of the drill to an opposite side of the web and passing through a longitudinal axis of the drill, first and second primary clearance face surfaces positioned on opposite sides of the chisel edge, respectively, each primary clearance face surface being a substantially flat surface having its surface perimeter defined by a cutting edge, a straight trailing edge, a margin radius and a margin edge; the trailing edges of the first and second primary clearance face surfaces intersecting the cutting edges of the first and second surfaces at a point coincident with first and second end points of the chisel edge, respectively, first and second secondary clearance face surfaces, a width of the first and second primary clearance face surfaces being sufficiently narrow at a one third radial distance from the axial center of the drill so that a secondary clearance face relief angle is operative to provide adequate relief whereby an entry slope of the drill exceeds the primary clearance face relief angle at a one third radial distance from the axial center.

7. A drill as defined in claim 6 and whereby the chisel edge is defined by an intersection at the first and second secondary clearance face surfaces.

8. A drill as defined in claim 7 wherein a primary clearance face relief angle of the drill is within a range of 6 degrees to 8 degrees and a secondary clearance face relief angle is within a range of 23 degrees to 27 degrees.

9. A drill having a four surface drill point geometry comprising:
a chisel edge having a first end and a second end and extending from one flute of the drill to a second flute opposite the one flute,
first and second cutting edges extending from a periphery of the drill to the first end and second end of the chisel edge, respectively,
first and second primary clearance face surfaces, each extending along an entire length of the first and second cutting edges, respectively,
first and second secondary clearance face surfaces,
the first primary and first secondary clearance face surface intersecting in a first line that intersects the first end of the chisel edge where it meets the one flute,
the second primary and second secondary clearance face surface intersecting in a second line that intersects the second end of the chisel edge where it meets the second flute opposite the one flute.

10. A drill as defined in claim 9 wherein the first and second cutting edges are configured as a straight edge extending from the first and second ends of the chisel edge to first and second margins of the drill.

11. A drill as defined in claim 9 wherein the first and second cutting edges are configured with a concave curvilinear edge extending from the first and second ends of the chisel edge to first and second margins of the drill so that a first and second line tangent to the first and second cutting edges at the first and second margins respectively both lead a radial line of the drill passing through first and second intersections of the first and second cutting edges and the first and second margins respectively, whereby a positive rake angle is provided at a sidewall of a hole being drilled.

12. A drill as defined in claims 10 or 12 wherein the chisel edge is completely defined by an intersection of the first and second secondary clearance face surfaces.

13. A drill as defined in claim 12 wherein a primary clearance face relief angle of the drill is within a range of 6 to 8 degrees and a secondary clearance face relief angle is within a range of 23 to 27 degrees.

14. A drill as defined in claim 9 wherein
a circumferentially directed width of the first and secondary primary clearance face surfaces being adequately narrow where an angle of attack of the drill in drilling operations exceeds a primary relief angle of the first and second primary clearance face surfaces to permit the first and second clearance surfaces to provide adequate clearance.

15. A drill having a four surface drill point geometry comprising:
a chisel edge having first and second ends and extending from a first flute on one side of a web of the drill to a second flute on an opposite side of the web and passing through a longitudinal axis of the drill,
first and secondary primary clearance face surfaces positioned on opposite sides of the chisel edge, each primary clearance face surface having a surface contour substantially defined by a cutting edge, a trailing edge and a margin edge, the cutting edge and trailing edge of the first and second primary clearance face surfaces meeting with each other at a point substantially coincident with the first and second ends of the chisel edge respectively,
first and second secondary clearance face surfaces,
a circumferentially directed width between the cutting edge and the trailing edge sufficiently small at a radial distance from the longitudinal axis where an entry slope exceeds a relief angle of the first and second primary clearance face surfaces so that the first and second secondary clearance faces are operative to provide effective relief.

16. A drill having a four surface drill point geometry comprising:
a chisel edge having first and second ends and extending from a first flute on one side of a web of the drill to a second flute on an opposite side of the web and passing through a longitudinal axis of the drill,
first and second primary clearance face surfaces positioned on opposite sides of the chisel edge, each primary clearance face surface having a substantially planar surface and a surface contour substantially defined by a cutting edge, a trailing edge and a margin edge, the cutting edge and trailing edge of the first and second primary clearance face surfaces meeting with each other at a point substantially coincident with the first and second ends of the chisel edge, respectively,
first and second secondary clearance face surfaces,
a circumferentially directed width of the first and second primary clearance face surfaces being adequately narrow where an entry slope at the drill in drilling operations exceeds a primary relief angle of the first and second primary clearance face surfaces to permit the first and second secondary clearance face surfaces to provide adequate clearance.

* * * * *